US009967632B2

(12) United States Patent
Cooper et al.

(10) Patent No.: US 9,967,632 B2
(45) Date of Patent: May 8, 2018

(54) EMULATED TELEVISION TUNER VIA EXECUTION OF SOFTWARE BY A COMPUTING DEVICE

(75) Inventors: Paul R. Cooper, San Jose, CA (US); Yvonne N. Ellefson, Ben Lomond, CA (US); Arleen Camaganacan Fernando, Redwood City, CA (US); Imran Arif Maskatia, Hayward, CA (US); Matthew Ryan Patterson, Mountain View, CA (US); Matt Henry Van der Staay, San Jose, CA (US); Chad Michael Williams, San Mateo, CA (US)

(73) Assignee: Rovi Technologies Corporation, San Jose, CA (US)

( * ) Notice: Subject to any disclaimer, the term of this patent is extended or adjusted under 35 U.S.C. 154(b) by 845 days.

(21) Appl. No.: 12/719,813

(22) Filed: Mar. 8, 2010

(65) Prior Publication Data

US 2011/0219412 A1 Sep. 8, 2011

(51) Int. Cl.
*H04N 21/4143* (2011.01)
*H04N 21/443* (2011.01)
*H04N 21/61* (2011.01)
*H04N 21/426* (2011.01)

(52) U.S. Cl.
CPC ..... *H04N 21/6125* (2013.01); *H04N 21/4143* (2013.01); *H04N 21/4263* (2013.01); *H04N 21/443* (2013.01)

(58) Field of Classification Search
CPC ........... H04N 21/6125; H04N 21/4143; H04N 21/4263; H04N 21/443

USPC .................................................. 725/109, 38
See application file for complete search history.

(56) References Cited

U.S. PATENT DOCUMENTS

| | | | | |
|---|---|---|---|---|
| 5,590,312 | A  * | 12/1996 | Marisetty | 703/23 |
| 6,526,581 | B1 * | 2/2003 | Edson | 725/74 |
| 6,986,155 | B1 | 1/2006 | Courtney et al. | |
| 7,082,142 | B1 | 7/2006 | Begeja | |
| 2001/0049718 | A1 * | 12/2001 | Ozawa | H04N 7/163 709/203 |
| 2002/0099854 | A1 * | 7/2002 | Jorgensen | H04L 1/20 709/249 |
| 2005/0091029 | A1 * | 4/2005 | Traut | 703/27 |
| 2005/0204391 | A1 * | 9/2005 | Hunleth et al. | 725/78 |

(Continued)

OTHER PUBLICATIONS

"Microsoft TV IPTV Edition", Retrieved at <<http://download.microsoft.com/download/8/2/e/82e0418b-6989-434c-8cbc-101c12620262/MSTV_IPTV_Datasheet%20010405.pdf >>, 2004, pp. 2.

(Continued)

*Primary Examiner* — Nathan Flynn
*Assistant Examiner* — Tung T Trinh
(74) *Attorney, Agent, or Firm* — Haley Guiliano LLP

(57) ABSTRACT

Television tuner emulation techniques are described. In an implementation, a television tuner is emulated through execution of software on a processing system by a computing device, the emulated television tuner includes functionality to obtain television content over an Internet Protocol (IP) based network. The functionality of the emulated television tuner is exposed to one or more applications that are executed by the computing device such that the application is not aware that the television tuner is emulated through execution of the software.

20 Claims, 4 Drawing Sheets

(56) References Cited

U.S. PATENT DOCUMENTS

| | | | | |
|---|---|---|---|---|
| 2006/0184973 A1* | 8/2006 | de Heer | H04N 5/4401 | 725/80 |
| 2006/0291507 A1* | 12/2006 | Sarosi | H04N 21/431 | 370/493 |
| 2007/0043847 A1* | 2/2007 | Carter et al. | | 709/223 |
| 2007/0044130 A1* | 2/2007 | Skoog | H04N 7/162 | 725/110 |
| 2007/0050836 A1* | 3/2007 | Stanek et al. | | 725/131 |
| 2007/0079325 A1* | 4/2007 | de Heer | H04N 7/17318 | 725/32 |
| 2007/0118866 A1* | 5/2007 | Chen | H04N 5/44591 | 725/87 |
| 2007/0192810 A1* | 8/2007 | Pritchett | H04N 5/913 | 725/90 |
| 2007/0286420 A1* | 12/2007 | MacLean | H04N 7/162 | 380/201 |
| 2008/0219268 A1* | 9/2008 | Dennison | H04L 12/4625 | 370/395.2 |
| 2008/0301744 A1* | 12/2008 | Hutchings | | 725/110 |
| 2009/0158327 A1 | 6/2009 | Song et al. | | |
| 2009/0165066 A1 | 6/2009 | Brouda | | |
| 2009/0316709 A1* | 12/2009 | Polcha | H04N 21/2381 | 370/401 |
| 2010/0034201 A1* | 2/2010 | Barave | H04L 12/1822 | 370/389 |
| 2010/0053435 A1* | 3/2010 | Goziker | H04N 5/4401 | 348/558 |
| 2010/0153995 A1* | 6/2010 | Belz | H04N 5/50 | 725/39 |
| 2011/0075572 A1* | 3/2011 | Serbest | H04L 12/1868 | 370/248 |

OTHER PUBLICATIONS

Shih, et al., "Digital Content Protection Scheme Using MPEG-21 REL with Applications to DVB systems", Retrieved at <<http://ieeexplore.ieee.org/stamp/stamp.jsp?arnumber=04041668>>, Proceedings of the 2006 International Conference on Intelligent Information Hiding and Multimedia Signal Processing, Dec. 18-20, 2006, pp. 4.

"IP TV Software for PC", Retrieved at <<http://www.articlesbase.com/television-articles/ip-tv-software-for-pc-1645277.html>>, Dec. 30, 2009, pp. 3.

"Delivering IPTV with the Windows Media Platform", Retrieved at <<http://download.microsoft.com/download/a/0/c/a0cdabf4-ca7e-4e0b-9aed-f25c7113d6ac/Delivering_IPTV.doc>>, Nov. 2003, pp. 32.

"MY-IPTV Anywhere Server Software", Retrieved at <<http://www.my-iptv.com/us/eng/menu5d.php>>, Jan. 15, 2010, pp. 2.

Elander, Lynne, "Delivering on the Promise of IPTV", Retrieved at <<http://www.gdspublishing.com/ic_pdf/icta/micr.pdf>>, Jan. 15, 2010, pp. 44-46.

\* cited by examiner

400 ⟶

402
Emulate a television tuner through execution of software on a processing system by a computing device, the emulated television tuner including functionality to obtain television content over an Internet Protocol (IP) based network

↓

404
Expose the functionality of the emulated television tuner to one or more applications that are executed by the computing device such that the application is not aware that the television tuner is emulated through execution of the software

↓

406
Expose the functionality of the emulated television tuner to a distribution system that provides the television content over the IP based network such that the distribution system is not aware that the television tuner is emulated through execution of the software

*Fig. 4*

EMULATED TELEVISION TUNER VIA EXECUTION OF SOFTWARE BY A COMPUTING DEVICE

BACKGROUND

A computing device may obtain content from a variety of different sources. However, some sources traditionally involved dedicated hardware to access the content, and consequently devices that wished to access this content were configured to include hardware that was specially designed to receive the content.

For example, access to traditional television content involved use of a dedicated hardware television tuner, especially when desiring access to "premium" channels. Therefore, addition of this functionality to access television content involved adding this hardware to a device. This additional hardware could be expensive, cumbersome, and inefficient, especially in instances of devices having a relatively small form factor, such as mobile devices.

SUMMARY

Television tuner emulation techniques are described. In an implementation, a television tuner is emulated through execution of software on a processing system by a computing device, the emulated television tuner includes functionality to obtain television content over an Internet Protocol (IP) based network. The functionality of the emulated television tuner is exposed to one or more applications that are executed by the computing device such that the application is not aware that the television tuner is emulated through execution of the software.

In an implementation, a computing device includes a processing system and memory configured to maintain one or more modules that are executable on the processing system to emulate a hardware television tuner to include functionality to obtain television content via a network. The modules are also executable to expose the functionality to one or more applications that are executable on the processing system in a manner that emulates provision of the television content by a hardware television tuner.

In an implementation, one or more computer-readable media include instructions that are stored thereon that, responsive to execution by a computing device, causes the computing device to emulate a television tuner and reformat television content that was obtained via an Internet-Protocol based network to appear as if obtained via one or more broadcast channels to one or more applications that are executable by the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting a procedure in an example implementation in which a hardware television tuner is emulated using software.

DETAILED DESCRIPTION

Overview

Traditional techniques that were developed to access television content involved use of dedicated hardware devices. For example, a television tuner card was typically added to a traditional general purpose computer (e.g., a PC) so that the computer could access television content. However, addition of the card could be cumbersome, especially if done so "after the fact" such as by an unsophisticated user at a later point in time after purchasing the computer.

Television tuner emulation techniques are described. In an implementation, a hardware television tuner is emulated in software by a computing device. In this way, the computing device may access television content without addition of dedicated hardware devices. Further, this emulation may be performed to support legacy software of the computing device.

For example, the television tuner emulation may provide an interface that mimics the interface provided by a hardware television tuner. Therefore, applications that are configured to interact with the hardware television tuner may also interact with the emulated television tuner without modification, such as to "tune" to channels, interact with an electronic program guide (EPG), and so on. Further discussion of the television tuner emulation techniques may be found in relation to the following sections.

In the following discussion, an example environment is first described that is operable to perform television tuner emulation techniques. Example procedures are then described that may be employed in the example environment, as well as in other environments. Although these techniques are described as employed within a television environment in the following discussion, it should be readily apparent that these techniques may be incorporated within a variety of environments without departing from the spirit and scope thereof.

Example Environment

Figure 1:
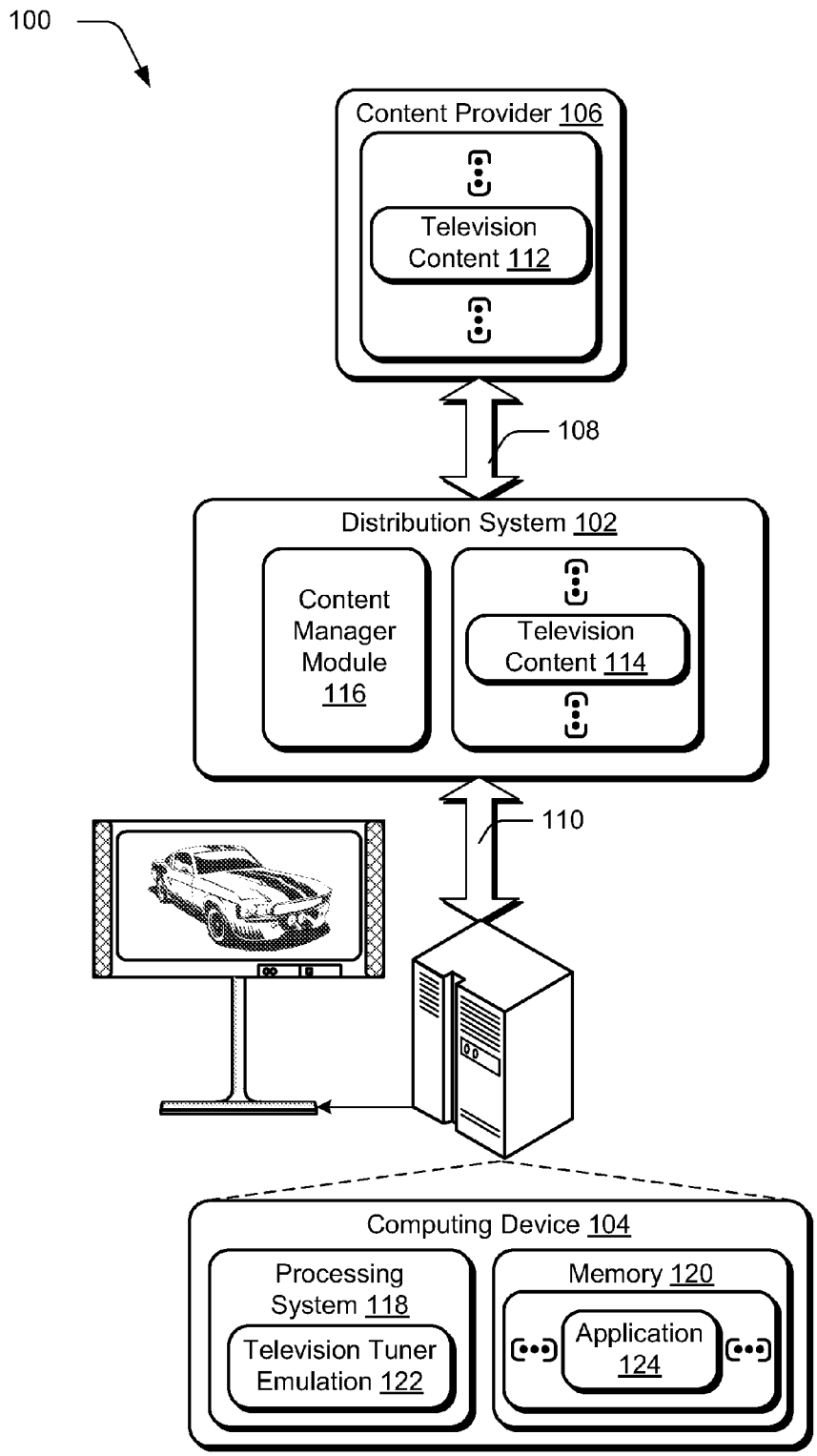
FIG. 1 is an illustration of an environment in an example implementation that is operable to employ television tuner emulation techniques.

FIG. 1 is an illustration of an environment 100 in an example implementation that is operable to perform television tuner emulation techniques. The illustrated environment 100 includes a distribution system 102 of a network operator which may employ one or more distribution servers, a computing device 104 and a content provider 106 that are communicatively coupled, one to another, via network connections 108, 110. In the following discussion, the distribution system 102, the computing device 104 and the content provider 106 may be representative of one or more entities, and therefore reference may be made to a single entity (e.g., the computing device 104) or multiple entities (e.g., the computing devices 104, the content providers 106, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) based network, and so on.

The computing device 104 may be configured in a variety of ways. For example, the computing device 104 may be configured as a general purpose computer as illustrated that is capable of communicating over the network connection 110, such as a desktop computer (e.g. a media center computer), a laptop computer, a netbook, a tablet personal computer, and so on. The computing device 104 may also be configured to specific situations, such as a mobile station, an entertainment appliance, a set-top box communicatively coupled to a display device, a wireless phone, and so forth.

The content provider 106 includes one or more items of television content 112. The television content 112 may include a variety of data, such as television programming, video-on-demand (VOD) files, "premium" television content (e.g. pay-per-view, subscription based television content), and so on. The television content 112 is communicated over the network connection 108 to the distribution system 102.

Television content 112 communicated via the network connection 108 is received by the distribution system 102 and may be stored as one or more items of television content 114. The television content 114 may be the same as or different from the television content 112 received from the content provider 106. For example, the distribution system 102 is illustrated as including a content manager module 116. The content manager module 116 is representative of functionality to configure content 114 for streaming over the network connection 110 to the computing device 104.

The content manager module 116, for instance, may configure content 112 received from the content provider 106 to be suitable for transmission over the network connection 108, such as to "packetize" the content 114 into a plurality of streams that are encapsulated within a transport stream (e.g., MPEG2) for distribution over the Internet, map the content 114 to particular channels, and so on. In another instance, the content manager module 116 may configure the television content 114 to include additional data for broadcast to the computing device 104, such as electronic program guide data, and so on. A variety of other instances are also contemplated.

The computing device 104, as previously stated, may be configured in a variety of ways to receive the television content 114 streamed over the network connection 110. The computing device 104 typically includes hardware and software for output of the television content 114, e.g., by the illustrated display device and speakers.

The computing device 104, as illustrated in the environment 100 of FIG. 1, also includes a processing system 118 and memory 120. The processing system 118 may include one or more processors that are configured to execute instructions that are stored in the memory 120. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 120 is shown for the computing device 104, a wide variety of types and combinations of memory may be employed, such as random access memory (RAM), hard disk memory, removable medium memory, and other types of computer-readable media.

Thus, in the environment 100 of FIG. 1, the content provider 106 may broadcast the content 112 over a network connection 108 to a multiplicity of network operators, an example of which is illustrated as distribution system 102. The distribution system 102 may then stream the content 114 over a network connection 110 to a multitude of computing devices, an example of which is illustrated as computing device 104. The computing device 104 may then store the content 114 and/or render the content 114 immediately for output as it is received, such as when the computing device 104 is configured to include digital video recorder (DVR) functionality.

As previously described, access to television content traditionally involved specialized hardware resources, such as to decrypt the television content 114, tune to particular channels, and so on. Therefore, traditional computing devices were specially configured using these specialized hardware resources to access the television content 114, which could be expensive and difficult to perform on "legacy" devices that were not originally configured with this functionality.

In the environment 100 of FIG. 1, however, the computing device 104 is illustrated as including a television tuner emulation 112 that is implemented using software that is executable on the processing system 118 of the computing device 104. In this way, the television tuner emulation 122 may provide access to the television content 114 using general purpose hardware components of the computing device 104.

For example, the television tuner emulation 122 may be configured to obtain the television content 114 from the distribution system 102. The television content 114 may then be provided to one or more applications 124 of the computing device 104 using standard interfaces for hardware-based television tuners, such as channel selection and standard television content delivery. In this way, the applications 124 of the computing device 104 are not reconfigured to interact with the television tuner emulation 112 and are thus "not aware" the television tuner emulation 112 is be performed using software and not a traditional hardware-based television tuner.

Further discussion of interaction of the television tuner emulation 122 with the one or more applications 124 and the distribution system 102 may be found in relation to the following figure.

It should be noted that one or more of the entities shown in FIG. 1 may be further divided (e.g., the distribution system 102 may be implemented by a plurality of servers in a distributed computing system), combined, and so on and thus the environment 100 of FIG. 1 is illustrative of one of a plurality of different environments that may employ the described techniques.

Figure 2:
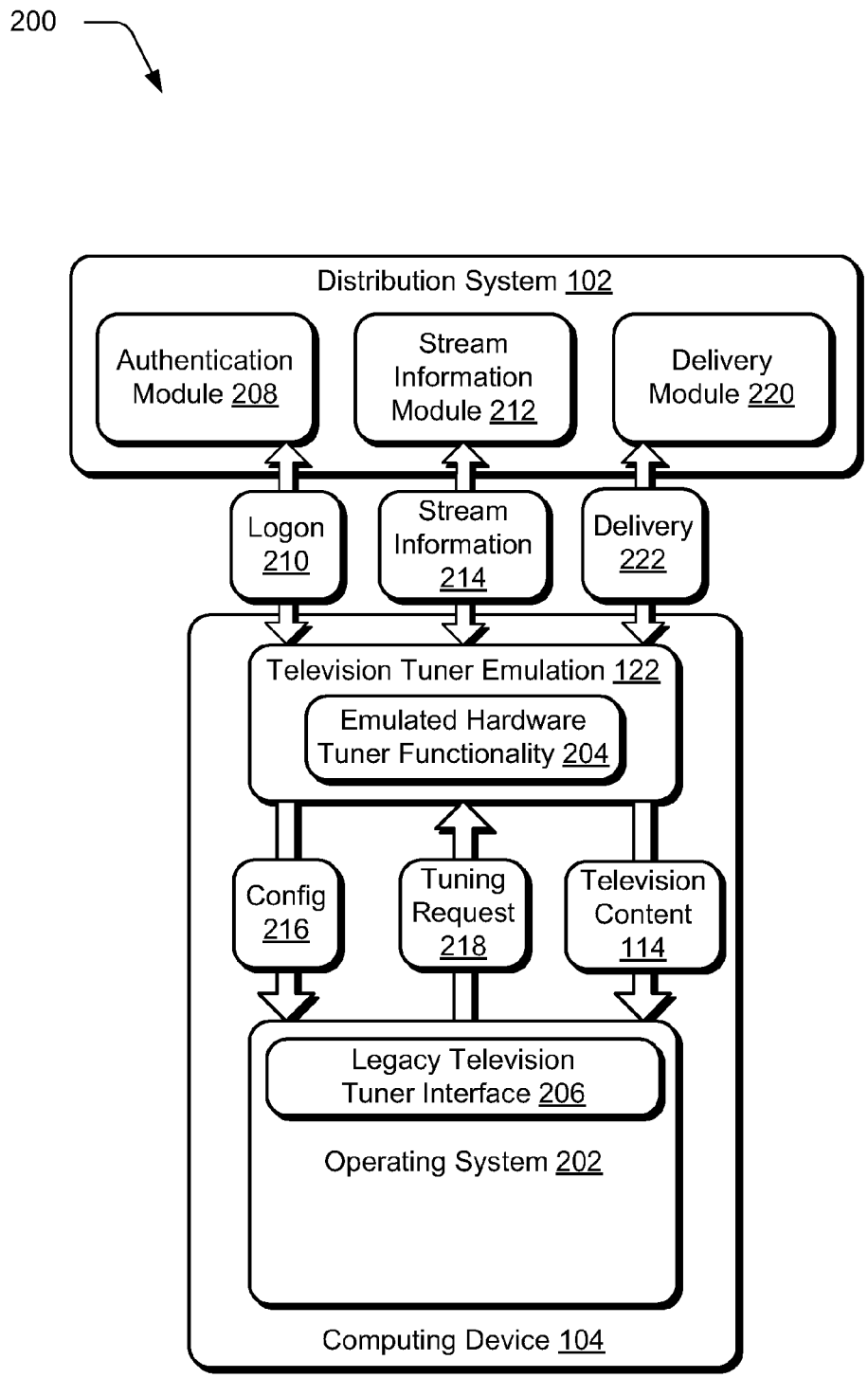
FIG. 2 is an illustration of an example system in which a television tuner emulation of FIG. 1 communicates television content to an application of FIG. 1 that is configured as an operating system.

FIG. 2 illustrates a system 200 in an example implementation in which the television tuner emulation 122 of FIG. 1 communicates television content 114 to an application 124 of FIG. 1 that is configured as an operating system 202. The television tuner emulation 122 is configured in this instance as a software program that is executable to obtain television content 114 from the distribution system 102. The television tuner emulation 122 is also configured to include emulated hardware tuner functionality 204 that mimics a traditional hardware television tuner using the operating system's 202 standard APIs for TV tuning (channel selection and video delivery). In this way, the legacy television tuner interface 206 of the operating system 202 or application may be used to interact with the television tuner emulation 122 without modification.

For example, the television tuner emulation 122 may first establish a connection with an authentication module 208 of the distribution system 102 to authenticate itself using logon 210 credentials, perform initialization, and so on. The television tuner emulation 122 may then contact a stream information module 212 to obtain stream information 214, which may include metadata and information about the streams of television content 114 that are available to a user from the distribution system 102.

The television tuner emulation 122 may then inform the operating system 202 through the legacy television tuner interface 206 that a tuner is available and which channels are available to the user through communication of configuration 216 information. For example, the television tuner emulation 122 may map IP addresses of distribution servers of the distribution system 102 to "tuner positions." In a hardware tuner, these map to the frequencies at which particular TV channels can be found. However, in this context, the video streams are not part of a continuous RF spectrum, but rather served by networked servers of the distribution system 102 over an Internet Protocol based network. Thus, logical "tuner positions" (e.g., channel numbers) may be mapped to IP addresses by the television tuner emulation 122, and inform the operating system 202 through the legacy television tuner interface 206 which "channels" are available.

Therefore, when a user decides to tune to a particular channel, the operating system 202 may receive an input that describes the channel. This input may then be communicated to the television tuner emulation 122 through the legacy television tuner interface 206 as a tuning request 218 for a particular channel. The television tuner emulation 122 may then map the requested channel to a set of IP addresses for the streams from the distribution system 102 that carry the television content that corresponds to that channel.

The television tuner emulation 122 may then establish a connection to a delivery module 220 of the distribution system 102 to obtain the television content 114 from corresponding distribution servers and begin downloading the stream using an internet real-time streaming protocol like RTP. In an implementation, the television tuner emulation 122 may be configured to establish and maintain connections to servers (e.g., unicast and multicast servers) of the distribution system 102 to obtain the television content 114 to enable "quick" channel changes. For example, a unicast stream may deliver data faster than real time and therefore may be used to fill buffers and show the television content 114 quicker than a multicast stream and therefore the unicast stream may be obtained and provided while the multicast stream is being obtained. Once obtained, the multicast stream may be used to replace the unicast stream for scalability.

Regardless of the type of stream being provided, the television tuner emulation 122 may then strip packet headers from packets delivered by the real-time streaming protocol and assemble a payload from the packets to form a stream of the television content 114 that is consistent with a traditional broadcast TV feed. This may include transforming various aspects of the television content 114 in the process. The television content 114 is then delivered via the legacy television tuner interface 206 as being delivered from the requested channel such that the operating system 202 may cause the television content 114 to be displayed to the user. Although a legacy television tuner interface 206 is described, it should be readily apparent that these techniques may be applied to a variety of pre-existing television tuner interfaces.

By supporting the legacy television tuner interface 206 through emulated hardware tuner functionality 204, the television tuner emulation may permit use of existing applications that consume television content, such as program guides, digital video recorders (DVRs), programs that translate and synchronize television content 114 to mobile devices, and so on. In this way, the television tuner emulation 122 may leverage an existing ecosystem of various applications that are built to use traditional hardware TV tuners. For example, the television tuner emulation 122 may enable Internet Protocol based television subscribers to use the full range of existing broadcast TV applications, thereby permitting an IPTV service operator (e.g., operator of the distribution system 102) to target a wider variety of devices. Additionally, the television tuner emulation 122 may be configured to support existing encryption without increasing the chances of compromise by a malicious party, further discussion of which may be found in relation to the following figure.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code having instruction to cause performance of specified tasks when executed on a processor (e.g., CPU or CPUs). The program code can be stored in one or more computer-readable memory devices, e.g., the memory 120 of the computing device 104. The features of the television tuner emulation techniques are platform-independent, meaning that the techniques may be implemented on a variety of commercial computing platforms having a variety of processors.

Figure 3:
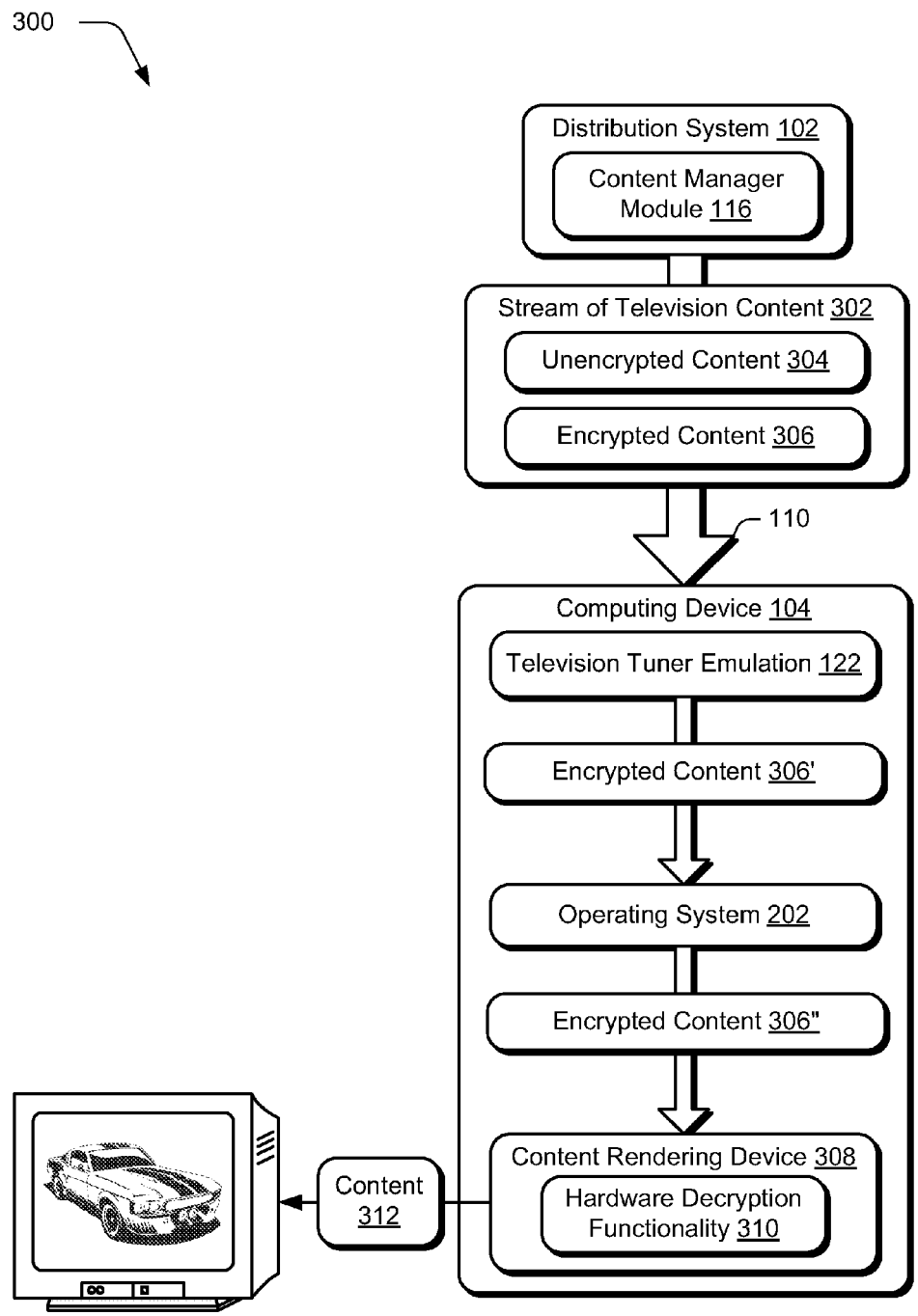
FIG. 3 is an illustration of an example system showing a distribution system and a computing device of FIG. 1 in greater detail as preserving encryption provided by the distribution system of FIG. 1.

FIG. 3 depicts a system 300 in an example implementation in which a computing device 104 is illustrated as preserving encryption provided by the distribution system 102. In this example, the content manager module 116 streams television content 302 that includes unencrypted content 304 and encrypted content 306. For example, the unencrypted content 306 may include metadata information (e.g., a title) and header information (e.g., packet headers) while the encrypted content 306 includes a payload, e.g., a television program itself. In this way, the encrypted content 306 is protected for communication over the network connection 110.

In this example, the television tuner emulation 122 is configured to process the unencrypted content 304 of the stream of television content 302 yet preserved the encrypted content 306. For instance, the television tuner emulation 122 may remove packet headers from the unencrypted content 304 to form encrypted content 306' that is configured in accordance with standard broadcast television protocols.

Therefore, the operating system 202 may consume the encrypted content 306' and pass on the encrypted content 306" to a content rendering device 308 that includes hardware decryption functionality 310 to form content 312 that is decrypted for display on a display device. For example, the hardware decryption functionality 310 may be part of a video card that includes a private key that is used to decrypt the encrypted content 306". The private key in this example is kept within hardware decryption functionality 310 of the content rendering device 308 and is not exposed for potential compromise by malicious parties. A variety of other implementations of the television tuner emulation 122 are also contemplated, further discussion of which may be found in relation to the following procedures.

Example Procedures

The following discussion describes television tuner emulation techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the systems 200, 300 of FIGS. 2 and 3, respectively.

FIG. 4 depicts a procedure 400 in an example implementation in which a hardware television tuner is emulated using software. A television tuner is emulated through execution of software on a processing system by a computing device, the emulated television tuner including functionality to obtain television content over an Internet Protocol (IP) based network (block 402). For example, the television tuner emulation 122 may be configured to interact with a distribution system 102 to provide credentials, obtain stream information 214 that describes what television content is available to a user of the computing device 104, locate the television content 114, and so on.

The television tuner emulation 122, for instance, may map one or more Internet Protocol addresses via which the television content is accessible to corresponding television channels. In another instance, the television tuner emulation 122 may merge unicast and multicast stream of television content to provide quick channel changes and transform the merged streams into a standard broadcast television stream for consumption. In this instance, applications that were not otherwise configured to consume the unicast and multicast stream may consume the standard broadcast television stream as before without modification. A variety of other examples and instances are also contemplated.

The functionality of the emulated television tuner is exposed to one or more applications that are executed by the computing device such that the application is not aware that the television tuner is emulated through execution of the software (block 404). As previously described in relation to FIG. 2, the emulated hardware tuner functionality 204 may be exposed to be consistent with a legacy television tuner interface 206 of an operation system 202 or other application 124. For example, the hardware tuner functionality 204 may include traditional channel changes, deliver the television content 114 in a standard broadcast format, and so on. Thus, the operating system 202 and other applications 124 may interact with the television tuner emulation 122 without modification.

The functionality of the emulated television tuner is exposed to a distribution system that provides the television content over the IP based network such that the distribution system is not aware that the television tuner is emulated through execution of the software (block 406). Continuing with the previous example, the emulated hardware tuner functionality 204 may interact with the distribution system 102 that also mimics traditional hardware tuners. Therefore, like the applications 124, the distribution system 102 may interact with the television tuner emulation 122 without modification. Thus, the television tuner emulation 122 may provide similar functionality to that of a hardware based tuner without use of specialized hardware resources by the computing device 104.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
    emulating a television tuner through execution of software on a processing system by a computing device, the emulated television tuner including functionality to obtain television content over an Internet Protocol (IP) based network;
    exposing the functionality of the emulated television tuner to an operating system that is executed by the computing device such that the emulated television tuner interacts directly with the operating system only through the operating system's standard APIs configured for television tuning in a non-IP based television delivery network;
    receiving at the emulated television tuner from the operating system, a non-IP based television delivery network request;
    translating the non-IP based delivery network request to a request for television content available from an address on the IP-based network, wherein the non-IP based delivery network request comprises an identification of a content source that is mapped to the address on the IP based network; and
    obtaining the television content based on the request for television content over the IP-based network.
2. A method as described in claim 1, further comprising exposing the functionality of the emulated television tuner to a distribution system that provides the television content over the Internet Protocol based network such that the distribution system is not aware that the television tuner is emulated through execution of the software.
3. A method as described in claim 1, wherein the emulating and the exposing includes channel change functionality to enable the operating system to request the television content via one or more television channels.
4. A method as described in claim 3, wherein the emulating of the channel change functionality includes mapping of one or more Internet Protocol addresses via which the television content is accessible to corresponding said television channels.
5. A method as described in claim 1, wherein the emulating includes merging unicast and multicast streams of the television content and transforming the merged streams into a standard broadcast television stream for consumption by the operating system.

6. A method as described in claim 5, wherein the operating system is not configured to consume the unicast and multicast streams.

7. A method as described in claim 1, wherein the exposing of the functionality of the emulated television tuner provides the television content in an encrypted state that is configured to be decrypted by hardware decryption functionality of a content rendering device of the computing device and is not configured to be decrypted by the operating system.

8. A method as described in claim 7, wherein the content rendering device is a video card.

9. A method as described in claim 1, wherein the television content is configured to be communicated to the computing device in accordance with one or more MPEG2 transport stream protocols.

10. A computing device comprising:
a processing system; and
memory configured to maintain one or more modules that are executable on the processing system to emulate a hardware television tuner to:
include functionality to obtain television content via a network; and
expose the functionality to an operating system that is executable on the processing system in a manner that emulates provision of the television content by a hardware television tuner by mapping Internet Protocol (IP) addresses of a distribution system that provides the television content to channel numbers that are exposed to the operating system, such that the functionality interacts directly with the operating system only through the operating system's standard APIs configured for television tuning in a non-IP-based television delivery network;
receive at the emulated hardware television tuner from the operating system, a non-IP based television delivery network request;
translate the non-IP based delivery network request to a request for television content available from an address on the IP-based network, wherein the non-IP based delivery network request comprises an identification of a content source that is mapped to the address on the IP based network; and
obtain the television content based on the request for television content over the IP-based network.

11. A computing device as described in claim 10, wherein the functionality is exposed so the operating system is unaware that the hardware television tuner is emulated through execution on the processing system.

12. A computing device as described in claim 10, wherein the functionality is exposed so a distribution system that provides the television content via the network is unaware that the hardware television tuner is emulated through execution on the processing system.

13. A computing device as described in claim 10, wherein the network is based on one or more Internet Protocols.

14. One or more computer-readable hardware media comprising instructions that are stored thereon that, responsive to execution by a computing device, causes the computing device to:
emulate a television tuner and reformat television content that was obtained via an Internet-Protocol based network to appear as if obtained via one or more broadcast channels to an operating system that is executable by the computing device, such that the operating system interacts directly with the emulated television tuner only through the operating system's standard APIs configured for television tuning in a non-IP-based television delivery network;
receive at the emulated television tuner from the operating system, a non-IP based television delivery network request;
translate the non-IP based delivery network request to a request for television content available from an address on the IP-based network, wherein the non-IP based delivery network request comprises an identification of a content source that is mapped to the address on the IP based network; and
obtain the television content based on the request for television content over the IP-based network.

15. One or more computer-readable hardware media as described in claim 14, wherein the television content provided by the emulated television tuner is configured to remain encrypted upon exposure to the operating system for subsequent decryption by hardware decryption functionality of a content rendering device of the computing device.

16. One or more computer-readable hardware media as described in claim 14, wherein the emulated television tuner is configured to switch between unicast and multicast video streams and transform the streams for consumption as standard broadcast television by the operating system.

17. One or more computer-readable hardware media as described in claim 16, wherein the emulated television tuner is configured to remove packet headers from the television content to provide the television content for consumption as standard broadcast television.

18. One or more computer-readable hardware media as described in claim 14, wherein the operating system includes a legacy television tuner interface.

19. One or more computer-readable hardware media as described in claim 18, wherein the legacy television tuner interface includes a digital video recorder.

20. One or more computer-readable hardware media as described in claim 18, wherein the legacy television tuner interface includes a program that translates and synchronizes television content to a mobile device.

* * * * *